UNITED STATES PATENT OFFICE.

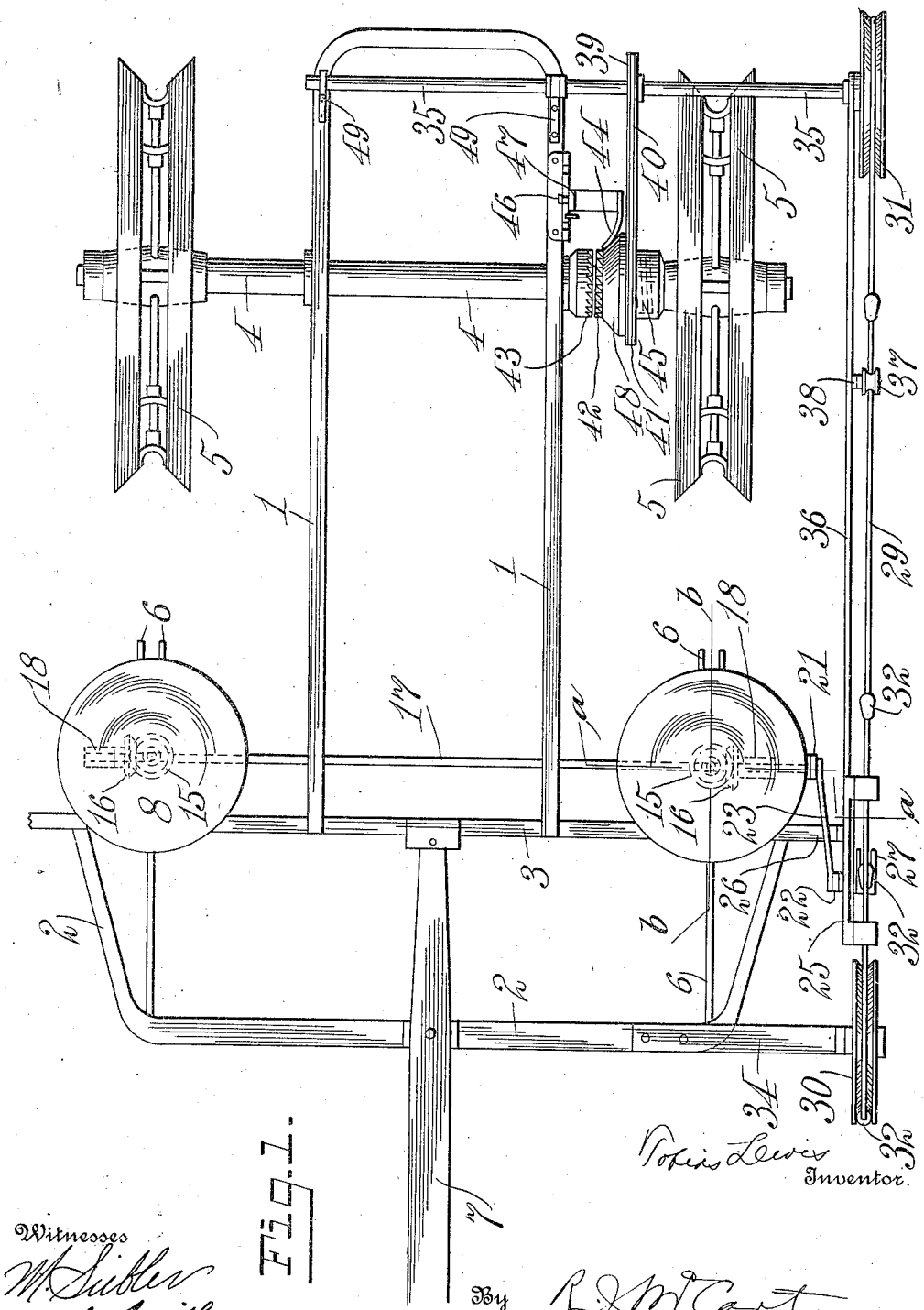

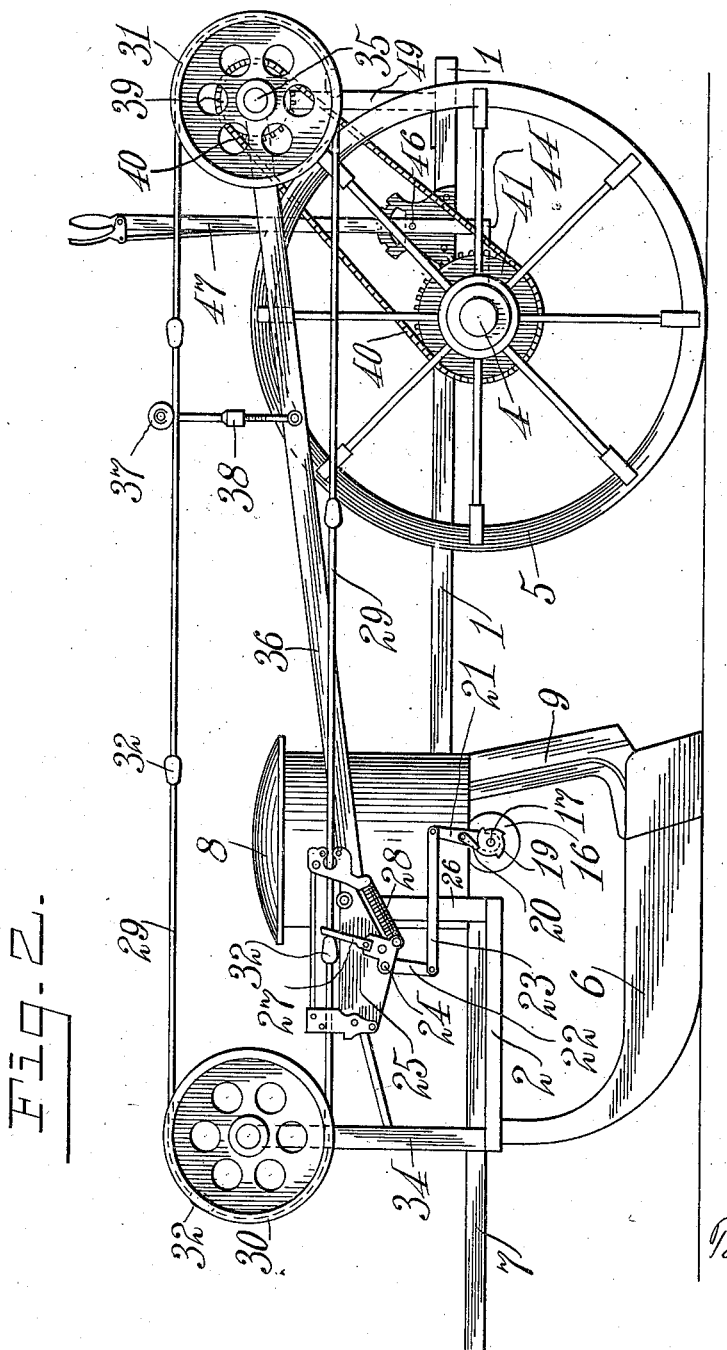

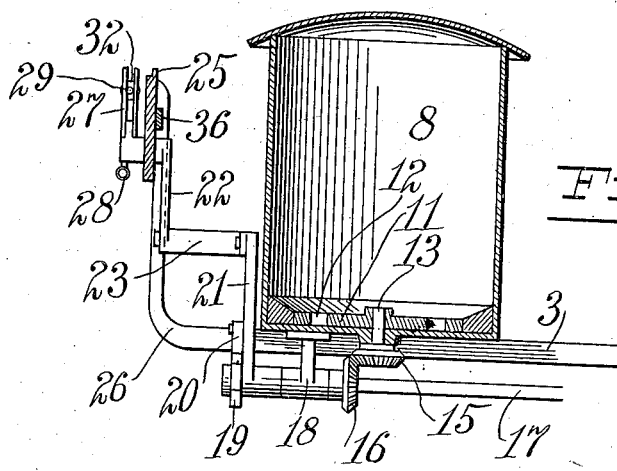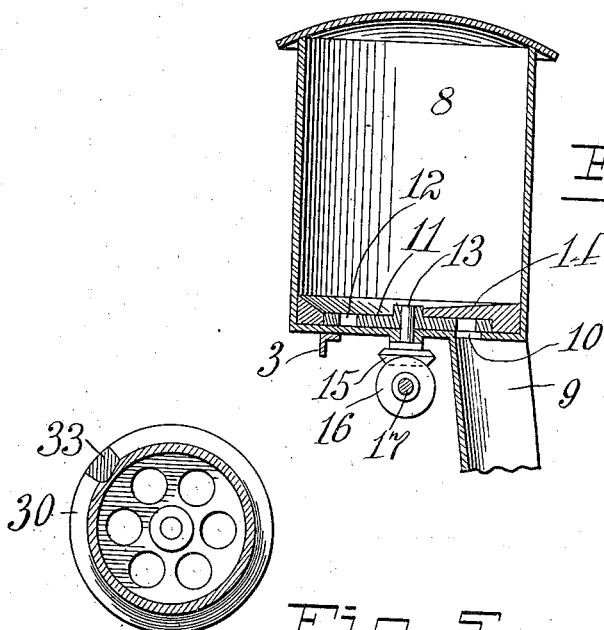

TOBIAS LEWIS, OF DAYTON, OHIO.

PLANTER.

996,265.  Specification of Letters Patent.  Patented June 27, 1911.

Application filed April 14, 1911. Serial No. 621,032.

*To all whom it may concern:*

Be it known that I, TOBIAS LEWIS, a citizen of the United States, residing at Dayton, in the county of Montgomery and State of Ohio, have invented certain new and useful Improvements in Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in wireless check-row planters.

The object of the invention is to provide certain improvements in the check-rowing devices as set forth in the following description and pointed out in the claim, whereby the operation of dropping the seed is rendered positive and accurate to a desirable extent. The check-row line supports are so arranged that the drop devices are actuated with a minimum of resistance due to friction etc. as will hereinafter appear.

Referring to the accompanying drawings, Figure 1 is a top plan view of a planter having my specific improvements applied thereto; Fig. 2 is a side elevation of the same; Fig. 3 is a section on the line $a\ a$ of Fig. 1; Fig. 4 is a section on the line $b\ b$ of Fig. 1; and Fig. 5 is a detail view of one of the sheaves.

Throughout the specification and drawings, similar reference characters indicate corresponding parts.

Referring more particularly to the drawings, 1 represents a horizontal frame provided with front cross bars 2 and 3, and mounted on an axle 4. The axle 4 is provided with traction wheels 5 which support the planter at the rear, while the forward end thereof is carried by runners or furrow opener 6 attached to the forward cross bar 2. The planter is provided with a draft tongue 7 attached to the front cross bars 2 and 3, and by means of which the machine is drawn. Mounted above each runner 6, on the front cross bar 3, is a seed hopper and feeder which may be of any approved form such as the following, Figs. 3 and 4.

8 represents a hopper proper which communicates with a respective runner 6 through a chute 9 and opening 10 in the bottom of the hopper. Lying against the bottom of each of the hoppers is a feed plate 11 provided with perforations 12, and mounted on a stud shaft 13. Portions of the said plates 11 are covered by plates 14 which lie above the openings 10 in the bottom of the hoppers. When the plates 11 are revolved and pass from under the plates 14, the seed within the hoppers will fall into the perforations 12, and when said perforations reach the openings 10 below the plate 14, said seed will drop through the chutes 9 and into the runners 6. The stud shafts 13 are each provided with a miter gear 15 which meshes with miter gears 16 on a lateral horizontal shaft 17 journaled in brackets 18. One end of the shaft 17 is provided with a ratchet 19 engaged by a pawl 20 on a crank 21 freely pivoted on the said shaft 17, and by means of which the shaft 17 and the dials or feed plates 11 are intermittently rotated. The crank 21 is connected with a crank 22 by means of a link 23. The crank 22 is mounted on a short rock shaft 24, Fig. 2, journaled in a plate 25, supported from the cross bar 3 by an upright bracket 26. Also mounted on the shaft 24 is a bifurcated trip crank 27 which is partially controlled by a spring 28.

Extending between the arms of the crank 27 is the under run of an endless horizontal cable or check-row line 29 which passes around front and rear sheaves 30 and 31. The cable 29 is provided with a plurality of enlargements 32 which successively engage the crank 27 to move the same against the tension of the spring 28. When one of the enlargements 32 is moving the crank 27, the perforated seed plate 11 is being rotated, and one of the perforations therein will be moved to a position above the opening 10, thereby dropping the seeds. When the enlargement passes the crank 27, the spring 28 will move the crank 27 to a normal position. It will thus be seen that the seed will be dropped each time the lever 27 is actuated by one of the projections 32. The seed will therefore be placed regularly. It will also be seen that the distance between seed drops may be varied by altering the number of enlargements 32. The sheaves 30 and 31 may be provided with depressions 33 to accommodate the enlargements 32. The front sheave 30 is an idler and is mounted on an upright bracket 34 extending from the front cross bar 2. The rear sheave 31 is the driver and the same is mounted upon a shaft 35 in a horizontal plane with the sheave 30. From this manner of mounting the check-row line 29 on sheaves in direct horizontal alinement, a straight force is directed on the seed-dropping arm 27, which avoids any torsional strain on the devices. The sheave end of the shaft 35 is journaled in an upwardly and forwardly inclined arm 36 which projects from the bracket or plate 25. This arm 36 maintains the sheaves 30 and 31 the proper distance apart. The other end of the shaft 35 is carried by brackets 49 extending from the main frame 1. The highest point of the arm 36, it will be noted, is equal to the height of the upright 34 upon which the sheave 30 is mounted. To take up whatever shock there may be in the cable 29, an idler 37 may be provided. This idler 37 engages the upper run of the cable, and the same is mounted on an adjustable arm 38 attached to the arm 36. The shaft 35 is provided with a sprocket 39 around which passes a sprocket chain 40, which in turn passes around a sprocket 41 freely mounted on the axle 4. The sprocket 41 is provided with a clutch portion 42 adapted to engage a clutch portion 43 rigidly attached to the shaft 4. A spring 45 is provided which normally maintains the two clutch portions in engagement, thereby allowing the wheels 5 to drive the cable 29 and to intermittently rotate the seed plates 11 through the intervening gearing above described. The clutch members 42 and 43 may be disengaged by a cam portion 44 on the lower end of a lever 47 pivoted at 46 to the frame 1. The cam portion 44 is adapted to engage a conical face 48 on the sprocket 41, and to thereby move the same longitudinally of the axle to disengage the clutch portions 42 and 43.

It will be seen from the above description, that in a check-row planter thus constructed, the seed will be dropped regularly without the aid of exterior devices, and as the machine is of simple construction, the possibility of its becoming inoperative is reduced to a minimum.

Having described my invention, I claim:

In a device of the class specified, the combination with a frame comprising forward cross beams and rearward longitudinal members, a rear axle member supporting the rear portion of said frame, traction wheels mounted on the ends of said axle, runners mounted on said forward cross beams, seed hoppers and feed plates adapted to discharge seed to said runners, a bracket attached to one of said forward cross beams, and a bifurcated lever pivoted on said bracket and connected with said feed plates, of a forward sheave, an upright extended from one of the cross beams and supporting said forward sheave, a rearward driving sheave in horizontal alinement with said forward sheave, an endless check-row line surrounding said sheaves and passing through said bifurcated lever, a clutch-controlled shaft driven from the rear axle and upon which said rearward sheave is mounted, said shaft being supported upon uprights extending from the rear end of the frame, and an inclined bar extending forwardly from the bracket attached to the rearward cross beams, to said shaft and serving to maintain the check-row line in position, substantially as herein shown and described.

In testimony whereof I affix my signature, in presence of two witnesses.

TOBIAS LEWIS.

Witnesses:
R. J. McCarty,
Matthew Siebler.

---

Copies of this patent may be obtained for five cents each, by addressing the "Commissioner of Patents, Washington, D. C."